(12) United States Patent
Dou et al.

(10) Patent No.: US 11,184,090 B2
(45) Date of Patent: Nov. 23, 2021

(54) METHOD AND DEVICE FOR DETERMINING QCL RELATIONSHIP BETWEEN ANTENNA PORTS

(71) Applicant: Huawei Technologies Co., Ltd., Shenzhen (CN)

(72) Inventors: Shengyue Dou, Shanghai (CN); Ting Wang, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 16/674,380

(22) Filed: Nov. 5, 2019

(65) Prior Publication Data
US 2020/0083966 A1    Mar. 12, 2020

Related U.S. Application Data

(63) Continuation of application No. PCT/CN2018/085704, filed on May 4, 2018.

(30) Foreign Application Priority Data

May 5, 2017   (CN) .......................... 201710311761.2

(51) Int. Cl.
   *H04B 17/12*     (2015.01)
   *H04B 7/06*      (2006.01)
   (Continued)

(52) U.S. Cl.
   CPC ........... *H04B 17/12* (2015.01); *H04B 7/0626* (2013.01); *H04L 5/0048* (2013.01); *H04W 24/10* (2013.01); *H04W 72/042* (2013.01)

(58) Field of Classification Search
   CPC ..... H04B 17/12; H04B 7/0626; H04L 5/0048; H04W 24/10; H04W 72/042
   See application file for complete search history.

(56) References Cited

U.S. PATENT DOCUMENTS

| 8,958,841 B2 | 2/2015 | Chung et al. |
| 2016/0142197 A1 | 5/2016 | Guo et al. |

(Continued)

FOREIGN PATENT DOCUMENTS

| CN | 104243087 A | 12/2014 |
| EP | 2919526 A1 | 9/2015 |

OTHER PUBLICATIONS

"Control signalling enhancement for NC-JT," 3GPP TSG RAN WG1 Meeting #88bis, Spokane, USA, R1-1704691, one page, 3rd Generation Partnership Project, Valbonne, France (Apr. 3-7, 2017).

(Continued)

*Primary Examiner* — Ronald B Abelson
(74) *Attorney, Agent, or Firm* — Leydig, Voit & Mayer, Ltd.

(57) ABSTRACT

This application provides a method and device for determining antenna port quasi co-location QCL. The method includes: generating, by a network device, downlink control information DCI, where the DCI includes QCL indication information, the QCL indication information is used to indicate one of a plurality of pieces of combination information, and first combination information in the plurality of pieces of combination information is used to indicate a QCL relationship between a DMRS antenna port and a CSI-RS antenna port; and sending, by the network device, the DCI to a terminal device. Therefore, in embodiments of this application, the terminal device can determine the QCL relationship between the DMRS antenna port and the CSI-RS antenna port based on the DCI, thereby resolving a problem in the prior art and improving network performance.

19 Claims, 2 Drawing Sheets

(51) Int. Cl.
*H04L 5/00* (2006.01)
*H04W 24/10* (2009.01)
*H04W 72/04* (2009.01)

(56) References Cited

U.S. PATENT DOCUMENTS

2016/0248561 A1* 8/2016 Davydov .................. H04L 5/00
2019/0222274 A1* 7/2019 Dou ..................... H04B 7/0456
2020/0228240 A1* 7/2020 Hong ...................... H04L 1/00

OTHER PUBLICATIONS

"Enhancements to control signaling," 3GPP TSG RAN WG1 NR #88bis, Spokane, USA, R1-1704424, pp. 1-3, 3rd Generation Partnership Project, Valbonne, France (Apr. 3-7, 2017).
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).
"Evaluation of the Impact of QCL Assumptions and Discussion on Potential QCL Configurations," 3GPP TSG RAN WG1 Meeting #86, Gothenburg, Sweden, R1-167199, pp. 1-7, 3rd Generation Partnership Project, Valbonne, France (Aug. 22-26, 2016).
"3rd Generation Partnership Project; Technical Specification Group Radio Access Network; Evolved Universal Terrestrial Radio Access (E-UTRA); Physical channels and modulation (Release 13)," 3GPP TS 36.211 V13.2.0, pp. 1-168, 3rd Generation Partnership Project, Valbonne, France (Jun. 2016).
"3rd Generation Partnership Project; Technical Specification Group Radio Access Network; Evolved Universal Terrestrial Radio Access (E-UTRA); Multiplexing and channel coding (Release 14)," 3GPP TS 36.212 V14.2.0, pp. 1-197, 3rd Generation Partnership Project, Valbonne, France (Mar. 2017).
"3rd Generation Partnership Project; Technical Specification Group Radio Access Network; Evolved Universal Terrestrial Radio Access (E-UTRA); Physical layer procedures (Release 14)," 3GPP TS 36.213 V14.2.0, p. 1-454, 3rd Generation Partnership Project, Valbonne, France (Mar. 2017).
"Overview on further enhancements to Coordinated Multi-Point operation," 3GPP TSG RAN WG1 Meeting #85, Nanjing, China, R1-164084, pp. 1-3, 3rd Generation Partnership Project, Valbonne, France (May 23-27, 2016).
"Potential enhancements for non-coherent JT," 3GPP TSG RAN WG1 Meeting #86, Gothenburg, SE, R1-167143, pp. 1-5, 3rd Generation Partnership Project, Valbonne, France (Aug. 22-26, 2016).
"Potential enhancements and specification impact analysis of non-coherent JT," 3GPP TSG RAN WG1 Meeting #86bis, Lisbon, Portugal, R1-1608610, pp. 1-5, 3rd Generation Partnership Project, Valbonne, France (Oct. 10-14, 2016).
"Enhancements on control signaling for non-coherent JT," 3GPP TSG RAN WG1 Meeting #87, Reno, USA, R1-1611177, pp. 1-4, 3rd Generation Partnership Project, Valbonne, France (Nov. 14-18, 2016).
"3rd Generation Partnership Project; Technical Specification Group Radio Access Network; NR; Radio Resource Control (RRC); Protocol specification (Release 15)," 3GPP TS 38.331 V0.0.2, total 13 pages, 3rd Generation Partnership Project, Valbonne, France (Mar. 2017).

* cited by examiner

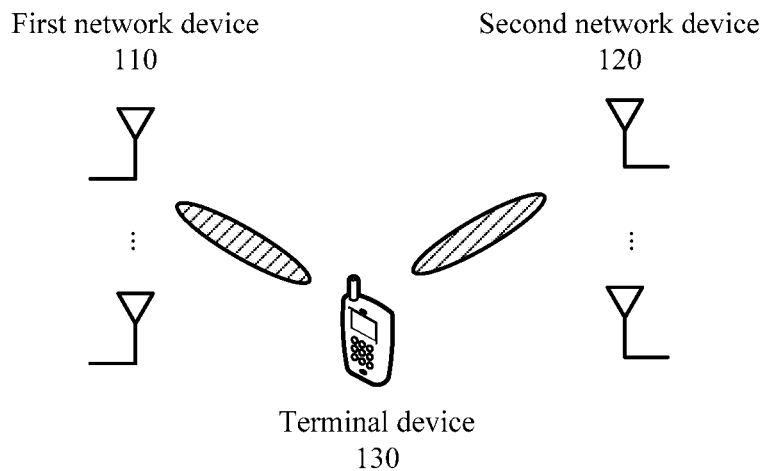
FIG. 1
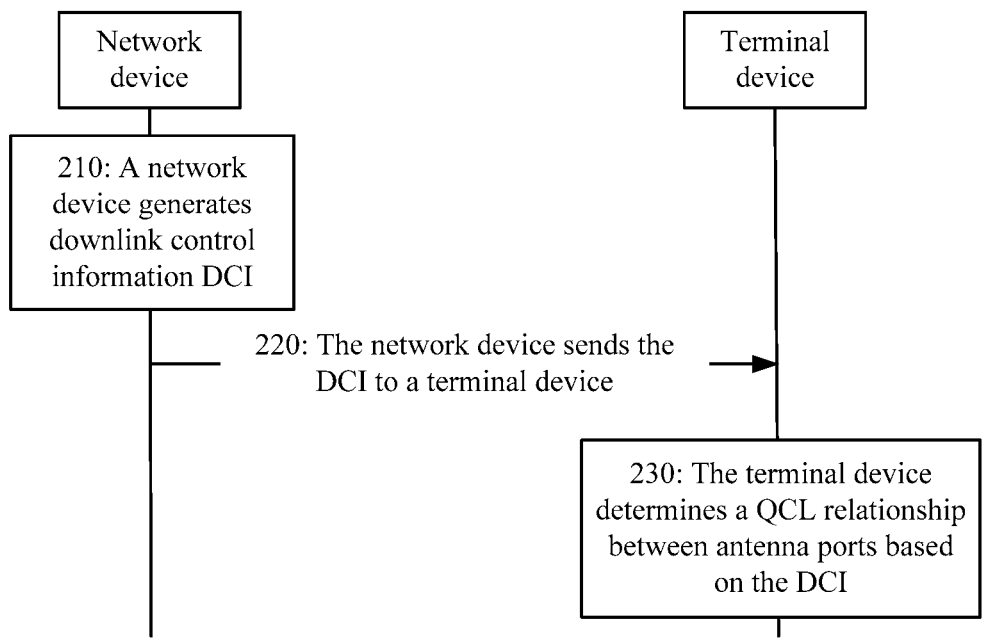
FIG. 2
CW1 ⟶ Layer 1 ⟶ Antenna port 1 ⟶ First network device
CW2 ⟶ Layer 2 ⟶ Antenna port 2 ⟶ Second network device
FIG. 3

METHOD AND DEVICE FOR DETERMINING QCL RELATIONSHIP BETWEEN ANTENNA PORTS

CROSS-REFERENCE TO RELATED APPLICATIONS

This application is a continuation of International Application No. PCT/CN2018/085704, filed on May 4, 2018, which claims priority to Chinese Patent Application No. 201710311761.2, filed on May 5, 2017. The disclosures of the aforementioned applications are hereby incorporated by reference in their entireties.

TECHNICAL FIELD

Embodiments of this application relate to the communications field, and more specifically, to a method and device for determining QCL relationship between antenna ports.

BACKGROUND

In an existing LTE system, TM10 supports coordinated multipoint transmission/reception (CoMP). Antenna quasi co-location (QCL) is defined in a protocol as follows: Signals sent from QCL antenna ports undergo same large-scale fading. Large-scale fading includes a delay spread, a Doppler spread, a Doppler shift, an average channel gain, and an average delay.

In a case of non-coherent joint transmission (NCJT), different transmission points (TP; or transmission reception point, TRP), for example, network devices, may transmit different multiple-input multiple-output (MIMO) data streams (MIMO layers) to a same terminal device on a same time-frequency resource within a same carrier. Therefore, a demodulation reference signal (DMRS) antenna port (DMRS ports) and a channel state information-reference signal (CSI-RS) antenna port (CSI-RS ports) that are on a first transmission point are QCL, and a DMRS antenna port and a CSI-RS antenna port that are on a second transmission point are QCL, but the antenna ports on the first transmission point are not QCL with the antenna ports on the second transmission point.

To correctly receive and demodulate a signal, the terminal device needs to know QCL relationships between the foregoing antenna ports, to perform demodulation on data based on the QCL relationships.

However, in the prior art, the network device does not configure the QCL relationships between the foregoing ports for the terminal device. As a result, the terminal device cannot obtain the foregoing QCL relationships, affecting network performance.

Therefore, how a terminal device determines a QCL relationship between pilot antenna ports becomes a problem to be resolved urgently.

SUMMARY

This application provides a method and device for determining antenna port QCL, so that a terminal device can determine a QCL relationship between pilot antenna ports.

According to a first aspect, a method for determining antenna port QCL is provided. The method includes:

generating, by a network device, downlink control information DCI, where the DCI includes QCL indication information, the QCL indication information is used by a terminal device to determine, from a plurality of pieces of combination information, combination information corresponding to the QCL indication information, and first combination information in the plurality of pieces of combination information is used to indicate at least one QCL relationship between first antenna port information and second antenna port information; and sending, by the network device, the DCI to the terminal device.

In other words, the network device generates the downlink control information DCI. The DCI includes the QCL indication information. The QCL indication information is used to indicate one of the plurality of pieces of combination information. One or more pieces of first combination information in the plurality of pieces of combination information are used to indicate at least two QCL relationships between the first antenna port information and the second antenna port information.

The network device sends the DCI to the terminal device.

It should be understood that the foregoing one piece of combination information indicated by the QCL indication information may be the first combination information.

It should be understood that a first antenna port may be, for example, a DMRS antenna port, and a second antenna port may be, for example, a CSI-RS antenna port. The first antenna port and the second antenna port may alternatively be other antenna ports, and this embodiment of this application is not limited thereto.

Therefore, in this embodiment of this application, a QCL relationship between the first antenna port and the second antenna port (for example, a DMRS antenna port and a CSI-RS antenna port) can be indicated by using the DCI, so that the terminal device can determine the QCL relationship between the first antenna port and the second antenna port based on the DCI. This resolves a problem in the prior art, and can improve network performance.

In this embodiment of this application, the plurality of pieces of combination information may be in a one-to-one correspondence with a plurality of pieces of QCL indication information. The one-to-one correspondence between the plurality of pieces of combination information and the plurality of pieces of QCL indication information may be stipulated in a protocol, or may be preconfigured. In other words, the network device and the terminal device may obtain, in advance, the plurality of pieces of combination information, and the one-to-one correspondence between the plurality of pieces of combination information and the plurality of pieces of QCL indication information.

The DCI includes one piece of QCL indication information, and the one piece of QCL indication information may be a 2-bit PQI. Different values of the PQI may correspond to different combination information. The one piece of QCL indication information is one of the plurality of pieces of QCL indication information. In this way, the terminal device can determine, from the plurality of pieces of combination information based on the one piece of QCL indication information (for example, a PQI field), one piece of combination information corresponding to the one piece of QCL indication information.

The first combination information may indicate one QCL relationship between first antenna port information and second antenna port information; or may indicate two or more QCL relationships between first antenna port information and second antenna port information, for example, indicate three or four QCL relationships between first antenna port information and second antenna port information. This embodiment of this application is not limited thereto.

Optionally, in an implementation of the first aspect, the first combination information is used to indicate a QCL relationship between a first set of first antenna port information and a first set of second antenna port information, and a QCL relationship between a second set of first antenna port information and a second set of second antenna port information.

It should be understood that the combination information has a plurality of forms in this embodiment of this application. The following describes the combination information in various cases in detail, and describes the one-to-one correspondence between the plurality of pieces of combination information and the plurality of pieces of QCL indication information in each case in this embodiment of this application.

Optionally, in an implementation of the first aspect, the first combination information includes a correspondence between a first code word and a first parameter set, and a correspondence between a second code word and a second parameter set.

The first code word corresponds to the first set of first antenna port information, the second code word corresponds to the second set of first antenna port information, the first parameter set corresponds to the first set of second antenna port information, and the second parameter set corresponds to the second set of second antenna port information.

In other words, the first combination information indicates a one-to-one correspondence between the two code words and the two parameter sets. Because one code word may correspond to one set of first antenna port information, and one parameter set may correspond to one set of second antenna port information, the first combination information finally indicates two QCL relationships between first antenna ports and second antenna ports.

Therefore, in this embodiment of this application, the QCL relationships between the first antenna ports and the second antenna ports (for example, DMRS antenna ports and CSI-RS antenna ports) can be indicated by using the DCI, so that the terminal device can determine the QCL relationships between the first antenna ports and the second antenna ports based on the DCI. This resolves the problem in the prior art, and can improve network performance.

Optionally, in an implementation of the first aspect, the first parameter set includes the following parameters:

a cell-specific reference signal CRS antenna port, a CRS frequency shift, a subframe configuration for a multicast/multicast single frequency network, a zero power channel state information-reference signal CSI-RS configuration, a start position of a data downlink shared channel PDSCH, and a co-located non-zero power CSI-RS configuration; and the second parameter set includes the following parameters:

a cell-specific reference signal CRS antenna port, a CRS frequency shift, a subframe configuration for a multicast/multicast single frequency network, a zero power channel state information-reference signal CSI-RS configuration, a start position of a data downlink shared channel PDSCH, and a co-located non-zero power CSI-RS configuration.

Optionally, in an implementation of the first aspect, the first combination information includes a correspondence between an identifier of a first antenna port group and a first parameter set, and a correspondence between an identifier of a second antenna port group and a second parameter set.

The identifier of the first antenna port group corresponds to the first set of first antenna port information, the identifier of the second antenna port group corresponds to the second set of first antenna port information, the first parameter set corresponds to the first set of second antenna port information, and the second parameter corresponds to the second set of second antenna port information.

The first code word corresponds to the first set of first antenna port information, the second code word corresponds to the second set of first antenna port information, the first parameter set corresponds to the first set of second antenna port information, and the second parameter set corresponds to the second set of second antenna port information.

In other words, the first combination information indicates a one-to-one correspondence between the identifiers of the antenna port groups of a first antenna (for example, identifiers of DMRS antenna port groups) and the parameter sets. Because an identifier of a first antenna port group corresponds to one group of first antenna ports, and one parameter set corresponds to one set of second antenna port information, the first combination information finally indicates QCL relationships between first antenna ports and second antenna ports.

Therefore, in this embodiment of this application, the QCL relationships between the first antenna ports and the second antenna ports (for example, DMRS antenna ports and CSI-RS antenna ports) can be indicated by using the DCI, so that the terminal device can determine the QCL relationships between the first antenna ports and the second antenna ports based on the DCI. This resolves the problem in the prior art, and can improve network performance.

Optionally, in an implementation of the first aspect, the first combination information includes a correspondence between an identifier of a first code block group CBG and a first parameter set, and a correspondence between an identifier of a second CBG and a second parameter set.

The first CBG corresponds to the first set of first antenna port information, the second CBG corresponds to the second set of first antenna port information, the first parameter set corresponds to the first set of second antenna port information, and the second parameter set corresponds to the second set of second antenna port information.

In other words, the first combination information indicates a one-to-one correspondence between the two CBGs and the two parameter sets. Because one CBG may correspond to one set of first antenna port information, and one parameter set may correspond to one set of second antenna port information, the first combination information finally indicates two QCL relationships between first antenna ports and second antenna ports.

Therefore, in this embodiment of this application, the QCL relationships between the first antenna ports and the second antenna ports (for example, DMRS antenna ports and CSI-RS antenna ports) can be indicated by using the DCI, so that the terminal device can determine the QCL relationships between the first antenna ports and the second antenna ports based on the DCI. This resolves the problem in the prior art, and can improve network performance.

Optionally, in an implementation of the first aspect, the first combination information is configured by using higher layer signaling. The first combination information includes a correspondence between first indication information of a first antenna port and a first parameter, and a correspondence between second indication information of the first antenna port and a second parameter.

The first indication information and the second indication information each include at least one of the following types of information:

a code word identifier, an identifier of a first antenna port group, a CBG identifier, and an identifier of the first antenna port.

The first indication information corresponds to the first set of first antenna port information, the second indication information corresponds to the second set of first antenna port information, the first parameter corresponds to the first set of second antenna port information, and the second parameter corresponds to the second set of second antenna port information.

Optionally, in an implementation of the first aspect, second combination information in the plurality of pieces of combination information is used to indicate one set of second antenna port information.

Therefore, in this embodiment of this application, a QCL relationship of a second antenna port (for example, a CSI-RS antenna port) can be indicated by using the DCI, and an existing single-point transmission scenario can be compatible; and the QCL relationships between first antenna ports and second antenna ports (for example, DMRS antenna ports and CSI-RS antenna ports) can be indicated by using the DCI in a joint transmission scenario. This can resolve the problem in the prior art, and can improve network performance.

According to a second aspect, a method for determining antenna port QCL is provided. The method includes:

obtaining, by a terminal device, downlink control information DCI, where the DCI includes QCL indication information;

determining, by the terminal device from a plurality of pieces of combination information based on the QCL indication information, combination information corresponding to the QCL indication information, where first combination information in the plurality of pieces of combination information is used to indicate at least one QCL relationship between first antenna port information and second antenna port information; and determining, by the terminal device, the QCL relationship between the first antenna port information and the second antenna port information based on the combination information corresponding to the QCL indication information.

In other words, the terminal device obtains the downlink control information DCI, where the DCI includes the QCL indication information;

the terminal device determines, from the plurality of pieces of combination information based on the QCL indication information, one piece of combination information corresponding to the QCL indication information, where the first combination information in the plurality of pieces of combination information is used to indicate at least two QCL relationships between the first antenna port information and the second antenna port information; and the terminal device determines the QCL relationships between the first antenna port information and the second antenna port information based on the combination information corresponding to the QCL indication information.

It should be understood that the foregoing one piece of combination information indicated by the QCL indication information may be the first combination information.

Therefore, in this embodiment of this application, the QCL relationship between a first antenna port and a second antenna port (for example, a DMRS antenna port and a CSI-RS antenna port) can be indicated by using the DCI, so that the terminal device can determine the QCL relationship between the first antenna port and the second antenna port based on the DCI. This resolves a problem in the prior art, and can improve network performance.

It should be understood that the second aspect corresponds to the first aspect. An execution body in the second aspect is the terminal device, and an execution body in the first aspect may be the network device. For a corresponding characteristic and a corresponding beneficial effect of the method performed on a terminal device side, refer to corresponding descriptions of a network device side in the first aspect. Therefore, for brevity, detailed descriptions are omitted as appropriate.

Optionally, in an implementation of the second aspect, the first combination information is used to indicate a QCL relationship between a first set of first antenna port information and a first set of second antenna port information, and a QCL relationship between a second set of first antenna port information and a second set of second antenna port information.

Optionally, in an implementation of the second aspect, the first combination information includes a correspondence between a first code word and a first parameter set, and a correspondence between a second code word and a second parameter set.

The first code word corresponds to the first set of first antenna port information, the second code word corresponds to the second set of first antenna port information, the first parameter set corresponds to the first set of second antenna port information, and the second parameter set corresponds to the second set of second antenna port information.

Optionally, in an implementation of the second aspect, the first parameter set includes the following parameters:

a cell-specific reference signal CRS antenna port, a CRS frequency shift, a subframe configuration for a multicast/multicast single frequency network, a zero power channel state information-reference signal CSI-RS configuration, a start position of a data downlink shared channel PDSCH, and a co-located non-zero power CSI-RS configuration; and the second parameter set includes the following parameters:

a cell-specific reference signal CRS antenna port, a CRS frequency shift, a subframe configuration for a multicast/multicast single frequency network, a zero power channel state information-reference signal CSI-RS configuration, a start position of a data downlink shared channel PDSCH, and a co-located non-zero power CSI-RS configuration.

Optionally, in an implementation of the second aspect, the first combination information includes a correspondence between an identifier of a first antenna port group and a first parameter set, and a correspondence between an identifier of a second antenna port group and a second parameter set.

The identifier of the first antenna port group corresponds to the first set of first antenna port information, the identifier of the second antenna port group corresponds to the second set of first antenna port information, the first parameter set corresponds to the first set of second antenna port information, and the second parameter corresponds to the second set of second antenna port information.

The first code word corresponds to the first set of first antenna port information, the second code word corresponds to the second set of first antenna port information, the first parameter set corresponds to the first set of second antenna port information, and the second parameter corresponds to the second set of second antenna port information.

Optionally, in an implementation of the second aspect, the first combination information includes a correspondence between an identifier of a first code block group CBG and a first parameter set, and a correspondence between an identifier of a second CBG and a second parameter set.

The first CBG corresponds to the first set of first antenna port information, the second CBG corresponds to the second set of first antenna port information, the first parameter set corresponds to the first set of second antenna port information, and the second parameter set corresponds to the second set of second antenna port information.

Alternatively, in an implementation of the second aspect, the first combination information is configured by using higher layer signaling. The first combination information includes a correspondence between first indication information of the first antenna port and a first parameter, and a correspondence between second indication information of the first antenna port and a second parameter.

The first indication information and the second indication information each include at least one of the following types of information:

a code word identifier, an identifier of a first antenna port group, a CBG identifier, and an identifier of the first antenna port.

The first indication information corresponds to the first set of first antenna port information, the second indication information corresponds to the second set of first antenna port information, the first parameter corresponds to the first set of second antenna port information, and the second parameter corresponds to the second set of second antenna port information.

Optionally, in an implementation of the second aspect, second combination information in the plurality of pieces of combination information is used to indicate one set of second antenna port information.

Optionally, in an implementation of the second aspect, the first antenna port is a demodulation reference signal DMRS antenna port, and the second antenna port is a channel state information-reference signal CSI-RS antenna port.

Therefore, in this embodiment of this application, a QCL relationship of a second antenna port (for example, a CSI-RS antenna port) can be indicated by using the DCI, and an existing single-point transmission scenario can be compatible; and QCL relationships between first antenna ports and second antenna ports (for example, DMRS antenna ports and CSI-RS antenna ports) can be indicated by using the DCI in a joint transmission scenario. This can resolve the problem in the prior art, and can improve network performance.

According to a third aspect, a network device is provided and is configured to perform the method in any one of the first aspect or the possible implementations of the first aspect. Specifically, the network device includes a unit configured to perform the foregoing method.

According to a fourth aspect, a terminal device is provided and is configured to perform the method in any one of the second aspect or the possible implementations of the second aspect. Specifically, the terminal device includes a unit configured to perform the foregoing method.

According to a fifth aspect, a network device is provided. The network device includes a processor and a memory, where the memory is configured to store a computer program, and the processor is configured to execute the computer program stored in the memory, to perform the method in any one of the first aspect or the possible implementations of the first aspect.

According to a sixth aspect, a terminal device is provided. The terminal device includes a processor and a memory, where the memory is configured to store a computer program, and the processor is configured to execute the computer program stored in the memory, to perform the method in any one of the second aspect or the possible implementations of the second aspect.

According to a seventh aspect, a computer-readable storage medium is provided. A computer program is stored in the computer-readable storage medium. When the computer program is executed by a computer, the method in any one of the first aspect or the possible implementations of the first aspect is implemented.

According to an eighth aspect, a computer-readable storage medium is provided. A computer program is stored in the computer-readable storage medium. When the computer program is executed by a computer, the method in any one of the second aspect or the possible implementations of the second aspect is implemented.

According to a ninth aspect, a computer program product is provided. When the computer program product is executed by a computer, the method in any one of the first aspect or the possible implementations of the first aspect is implemented.

According to a tenth aspect, a computer program product is provided. When the computer program product is executed by a computer, the method in any one of the second aspect or the possible implementations of the second aspect is implemented.

According to an eleventh aspect, a processing apparatus is provided, and includes a processor and an interface.

The processor is configured to perform the method in any one of the first aspect or the possible implementations of the first aspect.

According to a twelfth aspect, a processing apparatus is provided, and includes a processor and an interface.

The processor is configured to perform the method in any one of the second aspect or the possible implementations of the second aspect.

It should be understood that the processing apparatus in the eleventh aspect or the twelfth aspect may be a chip, and the processor may be implemented by hardware, or may be implemented by software. When implemented by hardware, the processor may be a logic circuit, an integrated circuit, or the like. When implemented by software, the processor may be a general purpose processor, and is implemented by reading software code stored in a memory. The memory may be integrated into the processor, or may exist independently outside the processor.

According to a thirteenth aspect, a communications system is provided. The communications system includes the network device in the third aspect or the fifth aspect, and the terminal device in the fourth aspect or the sixth aspect.

DESCRIPTION OF DRAWINGS

FIG. 1 is a schematic block diagram of a communications system to which an embodiment of this application is applicable;

FIG. 2 is a schematic flowchart of a method for determining antenna port QCL according to an embodiment of this application;

FIG. 3 is a schematic diagram of a correspondence between a code word and a first antenna port according to an embodiment of this application;

DESCRIPTION OF EMBODIMENTS

Figure 4:
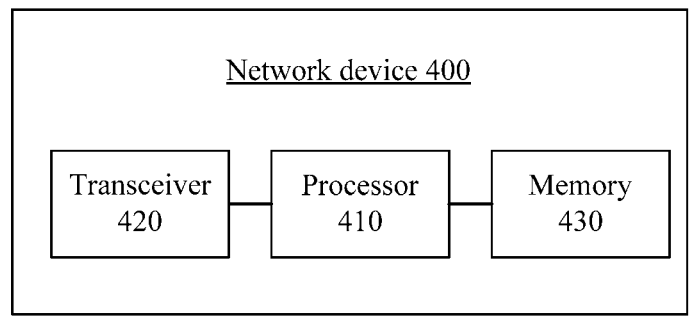
FIG. 4 is a schematic block diagram of a network device according to an embodiment of this application.

The following describes technical solutions of this application with reference to accompanying drawings.

Embodiments of this application may be applied to various communications systems. Therefore, the following descriptions are not limited to a specific communications system. For example, the embodiments of this application may be applied to a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), and a next generation communications system, that is, a 5th generation (5G) communications system, for example, a new radio (NR) system.

FIG. 1 is a schematic block diagram of a wireless communications system 100 to which an embodiment of this application is applicable. The wireless communications system 100 may include a first network device 110, a second network device 120, and one or more terminal devices 130 that are located in a coverage area of the first network device 110 and the second network device 120. The terminal device 130 may be mobile or fixed. Both the first network device 110 and the second network device 120 may communicate with the terminal device 130 through a wireless air interface. The first network device 110 and the second network device 120 may provide communication coverage for a particular geographical area, and may communicate with a terminal device located in the coverage area.

It should be understood that "first", "second", and the like in this embodiment of this application are used only for differentiation, and "first" and "second" are not used as limitations on this embodiment of this application.

The first network device 110 or the second network device 120 may be a base transceiver station (BTS) in global system for mobile communications (GSM) or code division multiple access (CDMA), may be a NodeB (NB) in wideband code division multiple access (WCDMA), or may be an evolved NodeB (eNB/eNodeB) in long term evolution (LTE), a relay station or an access point, an in-vehicle device, a wearable device, or a network-side device in a future 5G network, for example, a transmission point (TRP or TP) in an NR system, a gNodeB (gNB) in an NR system, or an antenna panel or a group of antenna panels (including a plurality of antenna panels) of a base station in a 5G system. This is not particularly limited in this embodiment of this application.

The terminal device 130 may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, an in-vehicle device, a wearable device, an unmanned aerial vehicle device, or a terminal device in a future 5G network.

The wireless communications system 100 may support CoMP transmission. Specifically, at least two network devices (transmission points) use a coordinated multipoint transmission/reception manner to transmit downlink data to a terminal device. In other words, on a same carrier, the terminal device 130 may communicate with the first network device 110 and may also communicate with the second network device 120. The coordinated multipoint transmission/reception manner may be implemented by using a technology such as space diversity and/or spatial multiplexing, and this is not limited in this application.

"Coordinated multipoint transmission/reception" in this application includes but is not limited to joint transmission JT. JT includes coherent JT and non-coherent JT (NCJT). A difference between the coherent JT and the NCJT is that beamforming is performed separately on different MIMO data streams from a plurality of cooperating TPs in the NCJT, and beamforming is jointly performed on all MIMO data streams from a plurality of cooperating TPs in the coherent JT. This application mainly relates to a method for determining antenna port QCL in an NCJT scenario.

In this embodiment of this application, the first network device may be a serving network device, and the second network device may be a cooperating network device; or the first network device may be a cooperating network device, and the second network device may be a serving network device.

In a scenario in which coordinated multipoint transmission/reception is applied, the serving network device may send control signaling to the terminal device, and the cooperating network device may send data to the terminal device; or the serving network device may send control signaling to the terminal device, and the serving network device and the cooperating network device may send data to the terminal device simultaneously; or the serving network device and the cooperating network device may send control signaling to the terminal device simultaneously, and the serving network device and the cooperating network device may send data to the terminal device simultaneously. This is not particularly limited in this embodiment of this application. Communication, for example, control message transfer, may be performed between the serving network device and the cooperating network device and between a plurality of cooperating network devices.

An example in which the first network device is a serving network device and the second network device is a cooperating network device is used. There may be one or more second network devices, and the second network device and the first network device are network devices that meet different quasi co-location (QCL) assumptions. It should be understood that the first network device and the second network device may alternatively be both serving network devices. This embodiment of this application is not limited thereto.

A network-side device may transmit, through antenna ports meeting quasi co-location, data to user equipment based on a mapping relationship between a code word and a layer and a mapping relationship between a layer and an antenna port in the prior art. However, when the terminal device does not obtain the QCL relationship, channel estimation accuracy and data demodulation performance are affected.

Two types (a type A (Type-A) and a type B (Type-B)) of QCL configurations are defined in an existing LTE protocol. The type-A defines a QCL configuration of one TP, that is, antenna ports (including a CRS antenna port, a DMRS antenna port, and a CSI-RS antenna port) of the TP meet QCL. The type-B defines a QCL configuration between a plurality of TPs, and the QCL configuration between the plurality of TPs may be indicated by a PDSCH resource mapping and quasi-co-location indicator (PDSCH RE mapping and Quasi-Co-Location indicator, PQI) (2 bits) in DCI. The PQI is specifically used to indicate a quasi co-location relationship between channel state information-reference signals (Channel State Information-Reference Signal, CSI-RS) antenna ports that meet QCL. In this embodiment of this application, the type-A may correspond to a case of a same antenna panel of a same network device in NR, and the type-B may correspond to a case of different antenna panels of a same network device in NR, and a case of different network devices in NR.

In an existing solution, for example, in the foregoing type-B defined in LTE, because all DMRS antenna ports are QCL, only a quasi co-location relationship between CSI-RS antenna ports is indicated by the PQI in the DCI. The network device does not configure a QCL relationship between a DMRS antenna port and a CSI-RS antenna port for the terminal device. As a result, the terminal device cannot obtain the relationship between the DMRS antenna port and the CSI-RS antenna port, affecting channel estimation accuracy of the terminal device and data demodulation performance of the terminal device, and affecting network performance.

The embodiments of this application provide a method for determining antenna port QCL, so that a terminal device can obtain a QCL relationship between DMRS and CSI-RS antenna ports, thereby resolving a problem in the prior art, and improving network performance.

It should be understood that, for a definition of QCL in the embodiments of this application, reference may be made to a definition in LTE, that is, signals sent from QCL antenna ports undergo same large-scale fading. Large-scale fading includes a delay spread, a Doppler spread, a Doppler shift, an average channel gain, and an average delay. However, the embodiments of this application are not limited thereto. For example, large-scale fading may further include space domain information, such as an angle of departure (AOD), an angle of arrival (AOA), a channel-related matrix, and a power spread spectrum. For the definition of QCL, reference may also be made to a related definition in future 5G.

For ease of understanding and description, the following describes, by way of example but not by way of limitation, an execution process and actions, in a communications system, of the method for determining antenna port QCL in this application.

FIG. 2 is a schematic flowchart of a method 200 for determining antenna port QCL according to an embodiment of this application. The method shown in FIG. 2 may be applied to the CoMP-supporting communications system shown in FIG. 1. The method 200 shown in FIG. 2 includes the following steps.

210: A network device generates downlink control information DCI.

Specifically, the DCI includes QCL indication information. The QCL indication information is used by a terminal device to determine, from a plurality of pieces of combination information, combination information corresponding to the QCL indication information. First combination information in the plurality of pieces of combination information is used to indicate at least one QCL relationship between first antenna port information and second antenna port information.

It should be understood that a first antenna port may be, for example, a DMRS antenna port, and a second antenna port may be, for example, a CSI-RS antenna port. The first antenna port and the second antenna port may alternatively be other antenna ports, and this embodiment of this application is not limited thereto.

It should be understood that the network device may be the first network device or the second network device in FIG. 1, or the network device may be a network device other than the first network device and the second network device. For example, the network device may be a serving network device when the first network device and the second network device are both cooperating network devices. This embodiment of this application is not limited thereto.

It should be understood that, in this embodiment of this application, a DCI format may be, for example, a DCI format 2D, or may be another DCI format, or another DCI format defined in future 5G. This is not particularly limited in this embodiment of this application.

In this embodiment of this application, the plurality of pieces of combination information may be in a one-to-one correspondence with a plurality of pieces of QCL indication information. The one-to-one correspondence between the plurality of pieces of combination information and the plurality of pieces of QCL indication information may be stipulated in a protocol, or may be preconfigured. In other words, the network device and the terminal device may obtain, in advance, the plurality of pieces of combination information, and the one-to-one correspondence between the plurality of pieces of combination information and the plurality of pieces of QCL indication information.

The DCI includes one piece of QCL indication information, and the one piece of QCL indication information may be a 2-bit PQI. Different values of the PQI may correspond to different combination information. The one piece of QCL indication information is one of the plurality of pieces of QCL indication information. In this way, the terminal device can determine, from the plurality of pieces of combination information based on the one piece of QCL indication information (for example, a PQI field), one piece of combination information corresponding to the one piece of QCL indication information.

Specifically, during transmission over a PDSCH, the network device may configure the plurality of pieces of combination information by using higher layer signaling, for example, RRC signaling, or the network device and the terminal device may negotiate and save the plurality of pieces of combination information in advance. During transmission over a PDCCH, the network device may send the DCI over the PDCCH. The DCI may indicate the corresponding one piece of combination information by using an information bit (that is, the QCL indication information, for example, the PQI field). The terminal device determines the QCL relationship between the first antenna port information and the second antenna port information based on the combination information, and then the terminal device performs processing, such as rate matching, based on a parameter of the QCL relationship.

For example, the correspondence (which may also be referred to as a mapping relationship) between the plurality of pieces of combination information and the plurality of pieces of QCL indication information is shown in Table 1. Specifically, as shown in Table 1, when the QCL indication information, that is, a value of the PQI field, in the DCI is "10", it indicates that combination information 3 corresponding to "10" is used by the terminal device to transmit data currently. In this case, the terminal device may determine the QCL relationship between the first antenna port and the second antenna port based on the combination information 3.

Therefore, in this embodiment of this application, the QCL relationship between the first antenna port and the second antenna port (for example, a DMRS antenna port and a CSI-RS antenna port) can be indicated by using the DCI, so that the terminal device can determine the QCL relationship between the first antenna port and the second antenna port based on the DCI. This resolves a problem in the prior art, and can improve network performance.

TABLE 1

| Value of the PQI field | Combination information corresponding to the value of the PQI field |
|---|---|
| 00 | Combination information 1 |
| 01 | Combination information 2 |
| 10 | Combination information 3 |
| 11 | Combination information 4 |

It should be understood that a quantity of pieces of the combination information may correspond to a quantity of bits of the PQI field. For example, the quantity of pieces of the combination information is $2^n$, n is the quantity of bits of the PQI field, a quantity of bit values of the PQI field is $2^n$, and n is a positive integer greater than 1.

It should be further understood that, in this embodiment of this application, the quantity of pieces of the combination information may alternatively be less than $2^n$. For example, the quantity of pieces of the combination information is $2^n-k$, where $1 \leq k < 2^n$. The 2n–k pieces of combination information are in a one-to-one correspondence with 2n–k bit values of the PQI field. In 2n bit values of the PQI field, remaining k bit values may be reserved (reversed) bits. This embodiment of this application is not limited thereto.

It should be further understood that an example in which the value of the PQI field has two bits is used for description in this specification. However, this embodiment of this application is not limited thereto. In actual application, the value of the PQI field may have one bit, two bits, three bits, four bits, or the like. When the quantity of bits in the value of the PQI field is another value, refer to the example in which the value of the PQI field has two bits in this specification. Details are not described in this specification again.

It should be further understood that an example in which the QCL indication information is the value of the PQI field is used for description in this specification. However, this embodiment of this application is not limited thereto. The QCL indication information may alternatively have another name, for example, a corresponding name defined in future 5G.

It should be understood that, for ease and brevity of description, only the example in which the QCL indication information is the value of the PQI field is used for description in this embodiment of this application. However, this embodiment of this application is not limited thereto. The QCL indication information may alternatively be other feasible information.

It should be further understood that an example in which the QCL indication information is in the one-to-one correspondence with the combination information is used for description in this specification. In other words, one piece of QCL indication information corresponds to one piece of combination information. However, this embodiment of this application is not limited thereto. For example, a quantity of pieces of preset QCL indication information may be less than the quantity of pieces of combination information, that is, one piece of QCL indication information may correspond to a plurality of pieces of combination information; or a quantity of pieces of preset QCL indication information is greater than the quantity of pieces of combination information, that is, a plurality of pieces of QCL indication information may correspond to a same piece of combination information, or the like.

It should be understood that, in this embodiment of this application, the first combination information may be any one of the plurality of pieces of combination information. This is not limited in this embodiment of this application.

The first combination information may indicate one QCL relationship between first antenna port information and second antenna port information; or may indicate two or more QCL relationships between first antenna port information and second antenna port information, for example, indicate three or four QCL relationships between first antenna port information and second antenna port information. This embodiment of this application is not limited thereto.

Optionally, in another embodiment, the first combination information is used to indicate two QCL relationships between first antenna ports and second antenna ports. Specifically, the first combination information is used to indicate a QCL relationship between a first set of first antenna port information and a first set of second antenna port information, and a QCL relationship between a second set of first antenna port information and a second set of second antenna port information.

For example, when the terminal device is in a non-coherent joint transmission scenario, the first combination information may indicate two QCL relationships between first antenna port information and second antenna port information. For example, the first combination information indicates a QCL relationship between a DMRS antenna port 7 and a CSI-RS antenna port 15 (for example, the DMRS antenna port 7 and the CSI-RS antenna port 15 are antenna ports used by the first network device in FIG. 1), and a QCL relationship between a DMRS antenna port 8 and a CSI-RS antenna port 16 (for example, the DMRS antenna port 8 and the CSI-RS antenna port 16 are antenna ports used by the second network device in FIG. 1).

It should be understood that, in this embodiment of this application, antenna port information may include an antenna port number, a pilot position, and the like. This embodiment of this application is not limited thereto. The first antenna port information may correspond to at least one first antenna port, and the second antenna port information may correspond to at least one second antenna port.

Optionally, in another embodiment, second combination information in the plurality of pieces of combination information is used to indicate one set of second antenna port information.

Specifically, in a dynamic point selection (DPS)/dynamic point blanking (DPB) scenario, that is, in a single-point transmission scenario, the second combination information may indicate one set of second antenna port information, for example, indicate that at least one CSI-RS antenna port meets a QCL relationship.

It should be understood that each of the plurality of pieces of combination information may be similar to the first combination information. Optionally, the plurality of pieces of combination information may alternatively include both the first combination information and the second combination information. This embodiment of this application is not limited thereto.

Therefore, in this embodiment of this application, a QCL relationship of a second antenna port (for example, a CSI-RS antenna port) can be indicated by using the DCI, and an existing single-point transmission scenario can be compatible; and QCL relationships between first antenna ports and second antenna ports (for example, DMRS antenna ports and CSI-RS antenna ports) can be indicated by using the DCI in the non-coherent joint transmission scenario. This can resolve the problem in the prior art, and can improve network performance.

It should be understood that the combination information has a plurality of forms in this embodiment of this application. The following describes the combination information in various cases in detail, and describes the one-to-one correspondence between the plurality of pieces of combination information and the plurality of pieces of QCL indication information in each case in this embodiment of this application.

Case 1:

The first combination information in the plurality of pieces of combination information includes a correspondence between a first code word and a first parameter set, and a correspondence between a second code word and a second parameter set.

The first combination information is used to indicate the QCL relationship between the first set of first antenna port information and the first set of second antenna port information, and the QCL relationship between the second set of first antenna port information and the second set of second antenna port information. The first code word corresponds to the first set of first antenna port information, the second code word corresponds to the second set of first antenna port information, the first parameter set corresponds to the first set of second antenna port information, and the second parameter set corresponds to the second set of second antenna port information.

In other words, the first combination information indicates a one-to-one correspondence between the two code words and the two parameter sets. Because one code word may correspond to one set of first antenna port information, and one parameter set may correspond to one set of second antenna port information, the first combination information finally indicates two QCL relationships between first antenna ports and second antenna ports.

It should be understood that user-plane data and a signaling message need to be processed at a packet data convergence protocol (PDCP) layer/a radio link control (RLC) layer/a media access control (MAC) layer before being sent through an air interface at a physical layer. Data processed at the physical layer is a protocol data unit (PDU) of the MAC layer, that is, a data stream. A code word is obtained by performing channel coding on a data stream from an upper layer. Different code words are used to distinguish different data streams. Because a quantity of code words is different from a quantity of transmit antennas, and code words may be mapped to different transmit antennas, layer mapping and precoding need to be performed. The layer mapping may be understood as remapping code words to a plurality of layers according to a specific rule. The precoding may be understood as mapping, to different antenna ports, data that is mapped to a plurality of layers (for ease of differentiation and description, an antenna port to which a code word is mapped is denoted as a data antenna port).

The network device encodes data to obtain a code word, maps the code word to a layer, then maps data to a data antenna port, and sends a data signal to the terminal device through the corresponding data antenna port; and sends a DMRS through the corresponding data antenna port, so that the terminal device performs demodulation on the received data based on the DMRS to obtain original data.

Therefore, it can be learned from the foregoing descriptions that there is a correspondence between a code word and a DMRS port. The following describes the correspondence between a code word and a DMRS port in detail with reference to FIG. 3.

Specifically, as shown in FIG. 3, a code word (CW1) may be mapped to a layer (a layer 1) through layer mapping, and then data is mapped to a data antenna port (for example, a DMRS antenna port 1, an antenna port 1 for short). The data antenna port belongs to a first network device. That is, data corresponding to the CW1 is sent by the first network device to a terminal device through the antenna port 1. Similarly, another code word (CW2) may be mapped to a layer (a layer 2) through layer mapping, and then data is mapped to a data antenna port (for example, a DMRS antenna port 2, an antenna port 2 for short). The data antenna port belongs to a second network device. That is, data corresponding to the CW2 is sent by the second network device to the terminal device through the antenna port 2. In other words, different network devices may transmit different code words. In this case, a code word corresponds to a layer, a layer corresponds to a data antenna port, and a data antenna port also corresponds to a network device.

As shown in Table. 2, the first combination information in the plurality of pieces of combination information includes the correspondence between the first code word (CW1) and the first parameter set (for example, a parameter set configured by higher layers), and the correspondence between the second code word (CW2) and the second parameter set (for example, a parameter set configured by higher layers).

TABLE 2

| Value of the PQI field (QCL indication information) | Correspondence between code words and parameter sets (combination information) |
|---|---|
| 00 | CW1, parameter set 1 configured by higher layers |
| | CW2, parameter set 1 configured by higher layers |
| 01 | CW1, parameter set 2 configured by higher layers |
| | CW2, parameter set 2 configured by higher layers |
| 10 | CW1, parameter set 3 configured by higher layers |
| | CW2, parameter set 4 configured by higher layers |
| 11 | CW1, parameter set 5 configured by higher layers |
| | CW2, parameter set 6 configured by higher layers |

It should be further understood that the first parameter set and the second parameter set may both be parameter sets configured by higher layers. A parameter set configured by higher layers may be understood as preconfigured parameters, or parameters that are configured by higher layers and delivered by using RRC signaling. The parameter set configured by higher layers may include the following content.

1. CRS antenna port (crs-PortsCount-r11)
2. CRS frequency shift (crs-FreqShift-r11)
3. Subframe configuration (mbsfn-SubframeConfigList-r11) for a multicast/multicast single frequency network (Multimedia Broadcast Multicast Service Single Frequency Network, MBSFN)
4. Zero power CSI-RS configuration (csi-RS-ConfigZPId-r11)
5. Start position of a PDSCH (pdsch-Start-r11)
6. Quasi co-located non-zero power CSI-RS configuration (qcl-CSI-RS-ConfigNZPId-r11)

Values of parameters in different parameter sets configured by higher layers are not completely the same.

It should be understood that, in this embodiment of this application, the parameter set configured by higher layers may further include another parameter, but is not limited to the parameters listed above.

In the parameter set configured by higher layers, the quasi co-located non-zero power CSI-RS configuration may be used to determine a CSI-RS antenna port (that is, the second antenna port). Therefore, in this embodiment of this application, it can be learned from Table 2 that there is a QCL relationship between a CSI-RS antenna port corresponding to each parameter set and a DMRS antenna port corresponding to a code word (for example, the CW1 or the CW2).

Therefore, according to Table 2, the terminal device may determine one piece of combination information based on the indication information in the DCI. For example, when the value of the PQI field is 11, combination information corresponding to 11 may be determined, that is, "CW1, parameter set 5 configured by higher layers; CW2, parameter set 6 configured by higher layers". The terminal device may determine QCL relationships between DMRS antenna ports and CSI-RS antenna ports based on the combination information.

Therefore, in this embodiment of this application, the QCL relationships between the first antenna ports and the second antenna ports (for example, DMRS antenna ports and CSI-RS antenna ports) can be indicated by using the DCI, so that the terminal device can determine the QCL relationships between the first antenna ports and the second antenna ports based on the DCI. This resolves the problem in the prior art, and can improve network performance.

It should be understood that, in this embodiment of this application, the parameter sets corresponding to the first code word and the second code word may be the same. For example, when the PQI is 00 or 01, the parameter sets corresponding to the CW1 and the CW2 are the same. This case corresponds to the dynamic point selection (Dynamic Point Selection, DPS)/dynamic point blanking (Dynamic Point Blanking, DPB) scenario.

Optionally, the parameter sets corresponding to the first code word and the second code word are different. For example, when the PQI is 10 or 11, the parameter sets corresponding to the CW1 and the CW2 are different. This case corresponds to the NCJT scenario.

Optionally, when the parameter sets corresponding to the first code word and the second code word in each of the plurality of pieces of combination information are different, that is, the first parameter set and the second parameter set are different, Table 2 in this embodiment of this application may be replaced with a form of Table 2-1. This embodiment of this application is not limited thereto.

TABLE 2-1

| Value of the PQI field (QCL indication information) | Correspondence between code words and parameter sets (combination information) |
| --- | --- |
| 00 | CW1, parameter set 1 configured by higher layers |
|  | CW2, parameter set 2 configured by higher layers |
| 01 | CW1, parameter set 3 configured by higher layers |
|  | CW2, parameter set 4 configured by higher layers |
| 10 | CW1, parameter set 5 configured by higher layers |
|  | CW2, parameter set 6 configured by higher layers |
| 11 | CW1, parameter set 7 configured by higher layers |
|  | CW2, parameter set 8 configured by higher layers |

It should be understood that Table 2 shows the one-to-one correspondence between the plurality of pieces of combination information and the QCL indication information. The plurality of pieces of combination information all belong to a same type of combination information, that is, are all similar to the first combination information. To be specific, each of the plurality of pieces of combination information includes the correspondence between the first code word and the first parameter set, and the correspondence between the second code word and the second parameter set. However, this embodiment of this application is not limited thereto.

To be compatible with the existing DPS/DPB scenario, alternatively, the preset correspondence (which may also be referred to as a mapping relationship), between the plurality of pieces of combination information and the QCL indication information, shown in Table 2 in this embodiment of this application may be transformed into a form in Table 3. As shown in Table 3, the plurality of pieces of combination information may include the first combination information (for example, corresponding combination information when the PQI is 10 or 11 in Table 3) and the second combination information (for example, corresponding combination information when the PQI is 00 or 01 in Table 3).

It should be understood that parameter sets, configured by higher layers, in Table 3 correspond to the parameter sets, configured by higher layers, in Table 2. To avoid repetition, details are not described herein again.

Therefore, in this embodiment of this application, a QCL relationship of a second antenna port (for example, a CSI-RS antenna port) can be indicated by using the DCI, and the existing single-point transmission scenario can be compatible; and QCL relationships between first antenna ports and second antenna ports (for example, DMRS antenna ports and CSI-RS antenna ports) can be indicated by using the DCI in a joint transmission scenario. This can resolve the problem in the prior art, and can improve network performance.

TABLE 3

| Value of the PQI field (QCL indication information) | Combination information |
| --- | --- |
| 00 | Parameter set 1 configured by higher layers |
| 01 | Parameter set 2 configured by higher layers |
| 10 | CW1, parameter set 3 configured by higher layers |
|  | CW2, parameter set 4 configured by higher layers |
| 11 | CW1, parameter set 5 configured by higher layers |
|  | CW2, parameter set 6 configured by higher layers |

Case 2:

The first combination information in the plurality of pieces of combination information includes a correspondence between an identifier of a first antenna port group and a first parameter set, and a correspondence between an identifier of a second antenna port group and a second parameter set.

The first combination information is used to indicate the QCL relationship between the first set of first antenna port information and the first set of second antenna port information, and the QCL relationship between the second set of first antenna port information and the second set of second antenna port information. The first code word corresponds to the first set of first antenna port information, the second code word corresponds to the second set of first antenna port information, the first parameter set corresponds to the first set of second antenna port information, and the second parameter corresponds to the second set of second antenna port information.

In other words, the first combination information indicates a one-to-one correspondence between the identifiers of antenna port groups of a first antenna (for example, identifiers of DMRS antenna port groups) and the parameter sets. Because an identifier of a first antenna port group corresponds to one group of first antenna ports, and one parameter set corresponds to one set of second antenna port information, the first combination information finally indicates QCL relationships between first antenna ports and second antenna ports.

Therefore, in this embodiment of this application, the QCL relationships between the first antenna ports and the second antenna ports (for example, DMRS antenna ports and CSI-RS antenna ports) can be indicated by using the DCI, so that the terminal device can determine the QCL relationships between the first antenna ports and the second antenna ports based on the DCI. This resolves the problem in the prior art, and can improve network performance.

As shown in Table 4, an example in which the first antenna port is a DMRS antenna port is used as an example. Table 4 shows the one-to-one correspondence between the plurality of pieces of combination information and the QCL indication information.

As shown in Table 4, when the PQI is 00, corresponding combination information includes one correspondence, and specifically, an identifier 1 of a DMRS antenna port group corresponds to a parameter set 1 configured by higher layers. When the PQI is 01, corresponding combination information includes one correspondence, and specifically, an identifier 2 of a DMRS antenna port group corresponds to a parameter set 2 configured by higher layers. A case in which the PQI is 00 or 01 may correspond to the DPS/DPB scenario.

It should be understood that the first parameter set and the second parameter set may both be parameter sets configured by higher layers. Parameter sets, configured by higher layers, in Table 4 correspond to the parameter sets, configured by higher layers, in Table 2. To avoid repetition, details are not described herein again.

TABLE 4

| Value of the PQI field (QCL indication information) | Correspondence between an identifier of a DMRS antenna port group and a parameter set (combination information) |
|---|---|
| 00 | Identifier 1 of a DMRS antenna port group, parameter set 1 configured by higher layers |
| 01 | Identifier 2 of a DMRS antenna port group, parameter set 2 configured by higher layers |
| 10 | Identifier 3 of a DMRS antenna port group, parameter set 3 configured by higher layers<br>Identifier 4 of a DMRS antenna port group, parameter set 4 configured by higher layers |
| 11 | Identifier 5 of a DMRS antenna port group, parameter set 5 configured by higher layers<br>Identifier 6 of a DMRS antenna port group, parameter set 6 configured by higher layers |

It should be understood that Table 4 shows the one-to-one correspondence between the plurality of pieces of combination information and the QCL indication information. The plurality of pieces of combination information each include a correspondence between an identifier of a first antenna port group and a parameter set configured by higher layers. However, this embodiment of this application is not limited thereto.

To be compatible with the existing DPS/DPB scenario, alternatively, the preset correspondence (which may also be referred to as a mapping relationship), between the plurality of pieces of combination information and the QCL indication information, shown in Table 4 in this embodiment of this application may be transformed into a form in Table 5. As shown in Table 5, the plurality of pieces of combination information may include the first combination information (for example, corresponding combination information when the PQI is 10 or 11 in Table 5) and the second combination information (for example, corresponding combination information when the PQI is 00 or 01 in Table 5).

It should be understood that parameter sets, configured by higher layers, in Table 5 correspond to the parameter sets, configured by higher layers, in Table 2. To avoid repetition, details are not described herein again.

Therefore, in this embodiment of this application, a QCL relationship of a second antenna port (for example, a CSI-RS antenna port) can be indicated by using the DCI, and the existing single-point transmission scenario can be compatible; and QCL relationships between first antenna ports and second antenna ports (for example, DMRS antenna ports and CSI-RS antenna ports) can be indicated by using the DCI in a joint transmission scenario. This can resolve the problem in the prior art, and can improve network performance.

TABLE 5

| Value of the PQI field (QCL indication information) | Combination information |
|---|---|
| 00 | Parameter set 1 configured by higher layers |
| 01 | Parameter set 2 configured by higher layers |
| 10 | Identifier 3 of a DMRS antenna port group, parameter set 3 configured by higher layers<br>Identifier 4 of a DMRS antenna port group, parameter set 4 configured by higher layers |
| 11 | Identifier 5 of a DMRS antenna port group, parameter set 5 configured by higher layers<br>Identifier 6 of a DMRS antenna port group, parameter set 6 configured by higher layers |

Case 3:

The first combination information includes a correspondence between an identifier of a first code block group CBG and a first parameter set, and a correspondence between an identifier of a second CBG and a second parameter set.

The first combination information is used to indicate the QCL relationship between the first set of first antenna port information and the first set of second antenna port information, and the QCL relationship between the second set of first antenna port information and the second set of second antenna port information. The first CBG corresponds to the first set of first antenna port information, the second CBG corresponds to the second set of first antenna port information, the first parameter set corresponds to the first set of second antenna port information, and the second parameter set corresponds to the second set of second antenna port information.

In other words, the first combination information indicates a one-to-one correspondence between the two CBGs and the two parameter sets. Because one CBG may correspond to one set of first antenna port information, and one parameter set may correspond to one set of second antenna port information, the first combination information finally indicates two QCL relationships between first antenna ports and second antenna ports.

Therefore, in this embodiment of this application, the QCL relationships between the first antenna ports and the second antenna ports (for example, DMRS antenna ports and CSI-RS antenna ports) can be indicated by using the DCI, so that the terminal device can determine the QCL relationships between the first antenna ports and the second antenna ports based on the DCI. This resolves the problem in the prior art, and can improve network performance.

There is a correspondence between a CBG and a DMRS port. Specifically, similar to a method of mapping CWs to DMRS ports, a table of mapping from CBGs to DMRS ports may be stipulated. In this way, a specific quantity of DMRS ports to which each CBG is mapped is determined.

As shown in Table 6, an example in which the first antenna port is a DMRS antenna port is used as an example. Table 6 shows the one-to-one correspondence between the plurality of pieces of combination information and the QCL indication information.

As shown in Table. 6, the first combination information in the plurality of pieces of combination information includes a correspondence between the first CBG (CBG 1) and the first parameter set (for example, a parameter set configured by higher layers), and a correspondence between the second CBG (CBG 2) and the second parameter set (for example, a parameter set configured by higher layers).

It should be understood that the first parameter set and the second parameter set may both be parameter sets configured by higher layers. Parameter sets, configured by higher layers, in Table 6 correspond to the parameter sets, configured by higher layers, in Table 2. To avoid repetition, details are not described herein again.

TABLE 6

| Value of the PQI field (QCL indication information) | Correspondence between CBGs and parameter sets (combination information) |
|---|---|
| 00 | CBG1, parameter set 1 configured by higher layers |
|  | CBG2, parameter set 1 configured by higher layers |
| 01 | CBG2, parameter set 2 configured by higher layers |
|  | CBG2, parameter set 2 configured by higher layers |
| 10 | CBG1, parameter set 3 configured by higher layers |
|  | CBG2, parameter set 4 configured by higher layers |
| 11 | CBG1, parameter set 5 configured by higher layers |
|  | CBG2, parameter set 6 configured by higher layers |

It should be understood that, in this embodiment of this application, the parameter sets corresponding to the first CBG and the second CBG may be the same. For example, when the PQI is 00 or 01, the parameter sets corresponding to the CBG1 and the CBG2 are the same. This case corresponds to the DPS/DPB scenario.

Optionally, the parameter sets corresponding to the first CBG and the second CBG are different. For example, when the PQI is 10 or 11, the parameter sets corresponding to the CBG1 and the CBG2 are different. This case corresponds to the NCJT scenario.

It should be understood that Table 6 shows the one-to-one correspondence between the plurality of pieces of combination information and the QCL indication information. The plurality of pieces of combination information all belong to a same type of combination information, that is, are all similar to the first combination information. To be specific, each of the plurality of pieces of combination information includes the correspondence between the first CBG and the first parameter set, and the correspondence between the second CBG and the second parameter set. However, this embodiment of this application is not limited thereto.

To be compatible with the existing DPS/DPB scenario, alternatively, the preset correspondence (which may also be referred to as a mapping relationship), between the plurality of pieces of combination information and the QCL indication information, shown in Table 6 in this embodiment of this application may be transformed into a form in Table 7. As shown in Table 7, the plurality of pieces of combination information may include the first combination information (for example, corresponding combination information when the PQI is 10 or 11 in Table 7) and the second combination information (for example, corresponding combination information when the PQI is 00 or 01 in Table 7).

It should be understood that parameter sets, configured by higher layers, in Table 7 correspond to the parameter sets, configured by higher layers, in Table 2. To avoid repetition, details are not described herein again.

Therefore, in this embodiment of this application, a QCL relationship of a second antenna port (for example, a CSI-RS antenna port) can be indicated by using the DCI, and the existing single-point transmission scenario can be compatible; and QCL relationships between first antenna ports and second antenna ports (for example, DMRS antenna ports and CSI-RS antenna ports) can be indicated by using the DCI in a joint transmission scenario. This can resolve the problem in the prior art, and can improve network performance.

TABLE 7

| Value of the PQI field (QCL indication information) | Combination information |
|---|---|
| 00 | Parameter set 1 configured by higher layers |
| 01 | Parameter set 2 configured by higher layers |
| 10 | CBG1, parameter set 3 configured by higher layers |
|  | CBG2, parameter set 4 configured by higher layers |
| 11 | CBG1, parameter set 5 configured by higher layers |
|  | CBG2, parameter set 6 configured by higher layers |

Case 4:

It can be learned from the foregoing descriptions that, in the case 1 to the case 3, a parameter set preconfigured by higher layers includes related information of the second antenna port, and does not include related information of the first antenna port. In the case 1 to the case 3, the correspondence between the first antenna port and the second antenna port is preconfigured, but is not configured by using higher layer signaling. The network device configures, through higher layers, only the parameter set corresponding to the second antenna port information.

A difference between the case 4 and the foregoing three cases is that a parameter set configured by higher layers is different from the parameter set configured by higher layers in the foregoing three cases. In the case 4, the parameter set configured by higher layers includes information about a second parameter set, and further includes the related information of the first antenna port, and a QCL relationship between the antenna port information corresponding to the first parameter set and the antenna port information corresponding to the second parameter set.

Specifically, in the case 4, the following is included:

As shown in Table 8, the first combination information (that is, a parameter set configured by higher layers) in the plurality of pieces of combination information includes a correspondence between first indication information of the first antenna port and a first parameter, and a correspondence between second indication information of the first antenna port and a second parameter.

The first indication information and the second indication information each include one of the following types of information:

a code word identifier, an identifier of a first antenna port group, a CBG identifier, and an identifier of the first antenna port.

The first combination information is used to indicate the QCL relationship between the first set of first antenna port information and the first set of second antenna port information, and the QCL relationship between the second set of first antenna port information and the second set of second antenna port information. The first indication information corresponds to the first set of first antenna port information, the second indication information corresponds to the second set of first antenna port information, the first parameter corresponds to the first set of second antenna port information, and the second parameter corresponds to the second set of second antenna port information.

TABLE 8

| Value of the PQI field (QCL indication information) | Combination information |
| --- | --- |
| 00 | Parameter set 1 configured by higher layers |
| 01 | Parameter set 2 configured by higher layers |
| 10 | Parameter set 3 configured by higher layers |
| 11 | Parameter set 4 configured by higher layers |

It should be further understood that, in the case 4, the parameter set configured by higher layers may be understood as preconfigured parameters, or parameters that are configured by higher layers and delivered by using RRC signaling. The parameter set configured by higher layers may include, for example, the following content.

1. CRS antenna port (crs-PortsCount-r11)
2. CRS frequency shift (crs-FreqShift-r11)
3. Subframe configuration (mbsfn-SubframeConfigList-r11) for a multicast/multicast single frequency network (Multimedia Broadcast Multicast Service Single Frequency Network, MBSFN)
4. Zero power CSI-RS configuration (csi-RS-ConfigZPId-r11)
5. Start position of a PDSCH (pdsch-Start-r11)
6. First parameter (for example, a quasi co-located non-zero power CSI-RS configuration (qcl-CSI-RS-ConfigNZPId-r11))
7. Second parameter (for example, a quasi co-located non-zero power CSI-RS configuration (qcl-CSI-RS-ConfigNZPId-r11))
8. First indication information of a DMRS antenna port
9. Second indication information of a DMRS antenna port
10. That the first parameter corresponds to the first indication information, and the second parameter corresponds to the second indication information Optionally, the foregoing parameters 6 to 10 may be replaced with the following parameters 11 and 12. This embodiment of this application is not limited thereto.

11. First parameter (for example, quasi co-located non-zero power CSI-RS configuration (qcl-CSI-RS-ConfigNZPId-r11)), and first indication information of a DMRS antenna port 12. Second parameter (for example, quasi co-located non-zero power CSI-RS configuration (qcl-CSI-RS-ConfigNZPId-r11)), and second indication information of a DMRS antenna port It should be understood that, in this embodiment of this application, the parameter set configured by higher layers may further include another parameter, but is not limited to the parameters listed above.

Values of the first parameter and the second parameter are different. The first parameter and the second parameter each indicate one set of second antenna port information. The first indication information and the second indication information are different. The first indication information and the second indication information each indicate one set of first antenna port information. Therefore, in the case 4, each piece of combination information (a new parameter set configured by higher layers) may indicate QCL relationships between the first antenna port information and the second antenna port information by using the correspondence between the first parameter and the first indication information and the correspondence between the second parameter and the second indication information.

Therefore, in this embodiment of this application, the QCL relationships between first antenna ports and second antenna ports (for example, DMRS antenna ports and CSI-RS antenna ports) can be indicated by using the DCI, so that the terminal device can determine the QCL relationships between the first antenna ports and the second antenna ports based on the DCI. This resolves the problem in the prior art, and can improve network performance.

It should be understood that, to be differentiated from the parameter set configured by higher layers in the case 1 to the case 3, the parameter set configured by higher layers in the case 4 may be referred to as a new parameter set configured by higher layers (hereinafter referred to as a new parameter set), and the parameter set configured by higher layers in the case 1 to the case 3 is referred to as an old parameter set configured by higher layers (hereinafter referred to as an old parameter set).

It should be further understood that, in the case 4, the plurality of pieces of combination information may all be new parameter sets. Correspondingly, Table 8 is changed to a form shown in Table 9.

TABLE 9

| Value of the PQI field (QCL indication information) | Combination information |
| --- | --- |
| 00 | New parameter set 1 configured by higher layers |
| 01 | New parameter set 2 configured by higher layers |
| 10 | New parameter set 3 configured by higher layers |
| 11 | New parameter set 4 configured by higher layers |

Alternatively, in the case 4, the plurality of pieces of combination information may include both a new parameter set and an old parameter set. For example, as shown in Table 10, the plurality of pieces of combination information may include the first combination information, that is, a new parameter set (for example, corresponding combination information when the PQI is 10 or 11 in Table 10), and the second combination information, that is, an old parameter set (for example, corresponding combination information when the PQI is 00 or 01 in Table 10).

It should be understood that, in the case 4, a case in which combination information is an old parameter set may correspond to the DPS/DPB scenario; and a case in which combination information is a new parameter set may correspond to the NCJT scenario.

It should be understood that when the plurality of pieces of combination information include both a new parameter set and an old parameter set, the DCI configured by the network device or the QCL indication information in the DCI may explicitly or implicitly indicate whether current transmission is DPS/DPB or NCJT transmission. This is not limited in this embodiment of this application.

Therefore, in this embodiment of this application, a QCL relationship of a second antenna port (for example, a CSI-RS antenna port) can be indicated by using the DCI, and the existing single-point transmission scenario can be compatible; and QCL relationships between first antenna ports and second antenna ports (for example, DMRS antenna ports and CSI-RS antenna ports) can be indicated by using the DCI in a joint transmission scenario. This can resolve the problem in the prior art, and can improve network performance.

It should be noted that, in this embodiment of this application, the one-to-one correspondence (the mapping relationship) between the plurality of pieces of combination information and the plurality of pieces of QCL indication information is described in a tabular form. However, this embodiment of this application is not limited thereto. In this specification, the tabular form is used merely for ease and vividness of description of the correspondence. In actual application, the correspondence may be described in the tabular form, or may be described by using a string of characters, or a piece of code. This embodiment of this application is not limited thereto.

TABLE 10

| Value of the PQI field (QCL indication information) | Combination information |
|---|---|
| 00 | Old parameter set 1 configured by higher layers |
| 01 | Old parameter set 2 configured by higher layers |
| 10 | New parameter set 3 configured by higher layers |
| 11 | New parameter set 4 configured by higher layers |

220: The network device sends the DCI to the terminal device.

Correspondingly, the terminal device receives the DCI.

230: The terminal device determines the QCL relationship between the antenna ports based on the DCI.

Specifically, the terminal device may determine, from the plurality of pieces of preconfigured combination information in the foregoing four cases based on the QCL indication information (for example, the value of the PQI field) in the DCI, the combination information corresponding to the QCL indication information. Further, the terminal device may determine the QCL relationship between the first antenna port information and the second antenna port information based on the combination information, for example, determine a QCL relationship between a DMRS antenna port and a CSI-RS antenna port.

For example, when the correspondence between the plurality of pieces of preconfigured combination information and the QCL indication information is shown in Table 2, and when the QCL indication information is that the value of the PQI field is 10, the terminal device may determine that a DMRS antenna port corresponding to the CW1 and a CSI-RS antenna port corresponding to the parameter set 3 configured by higher layers have a QCL relationship, and a DMRS antenna port corresponding to the CW2 and a CSI-RS antenna port corresponding to the parameter set 4 configured by higher layers have a QCL relationship.

Similarly, when the correspondence between the plurality of pieces of preconfigured combination information and the QCL indication information is shown in Table 5, and when the QCL indication information is that the value of the PQI field is 10, the terminal device may determine that a DMRS antenna port corresponding to the identifier 3 of the DMRS antenna port group and a CSI-RS antenna port corresponding to the parameter set 3 configured by higher layers have a QCL relationship, and a DMRS antenna port corresponding to the identifier 4 of the DMRS antenna port group and a CSI-RS antenna port corresponding to the parameter set 4 configured by higher layers have a QCL relationship.

When the correspondence between the plurality of pieces of preconfigured combination information and the QCL indication information is another case, the terminal device determines the QCL relationship based on the combination information in a similar manner. To avoid repetition, details are not described herein again.

After the terminal device determines the QCL relationship, the terminal device may perform processing, such as demodulation, on data based on the QCL relationship. It should be understood that, after the QCL relationship between the antenna ports is determined, the terminal device may perform corresponding processing according to a stipulation in an existing standard. A specific action performed by the terminal device after the QCL relationship between the antenna ports is determined is not limited in this embodiment of this application.

Therefore, in this embodiment of this application, a QCL relationship of a second antenna port (for example, a CSI-RS antenna port) can be indicated by using the DCI, and the existing single-point transmission scenario can be compatible; and QCL relationships between first antenna ports and second antenna ports (for example, DMRS antenna ports and CSI-RS antenna ports) can be indicated by using the DCI in a joint transmission scenario. This can resolve the problem in the prior art, and can improve network performance.

It should be noted that the parameter set configured by higher layers in Table 2 to Table 10 in the case 1 to the case 4 may further include another set of parameters about a CRS, that is, a parameter 1', a parameter 2', and a parameter 3', similar to CRS-related parameters (that is, parameters 1 to 3). The parameters 1 to 3 may correspond to a transmission point, and the parameter 1' to the parameter 3' may correspond to another transmission point.

For example, the parameter set configured by higher layers may include the following content.
1. CRS antenna port (crs-PortsCount-r11)
2. CRS frequency shift (crs-FreqShift-r11)
3. Subframe configuration (mbsfn-SubframeConfigList-r11) for a multicast/multicast single frequency network (Multimedia Broadcast Multicast Service Single Frequency Network, MBSFN)
1'. CRS antenna port (crs-PortsCount-r11)
2'. CRS frequency shift (crs-FreqShift-r11)
3'. Subframe configuration (mbsfn-SubframeConfigList-r11) for a multicast/multicast single frequency network (Multimedia Broadcast Multicast Service Single Frequency Network, MBSFN)
4. . . .

For another parameter, refer to related descriptions of the parameters configured by higher layers in Table 2 to Table 10 in the foregoing four cases. To avoid repetition, details are not described herein again.

Specifically, when mapping data, the network device may bypass CRS RE positions corresponding to the two sets of parameters, that is, send service data at another RE position. In this case, the network device may indicate the two sets of CRS parameters by using the value of the PQI in the DCI. Further, the terminal device determines the foregoing CRS RE positions based on the two sets of CRS parameters, and then the terminal device may bypass these RE positions, that is, perform processing, such as data check, at another RE position, thereby improving a correctness rate of data demodulation, and improving network performance.

The foregoing describes the parameters configured by higher layers in the NCJT scenario or in a scenario supporting DPS/DPB and NCJT.

In the foregoing case, the DCI may indicate the QCL indication information, or may indicate at least two sets of CRS parameters. Further, the terminal device may determine the QCL relationship based on the QCL indication information, and may perform rate matching based on the two sets of CRS parameters, thereby improving network performance.

The following describes a parameter set that is configured by higher layers and that is improved on a basis of the existing PQI, for example, in the DPS/DPB scenario, in the coherent joint transmission scenario, or in the foregoing type-B scenario, in this embodiment of this application. Specific information is shown in Table 11. Values of the PQI field may correspond to parameter sets configured by higher layers.

For example, the parameter set configured by higher layers may include the following content.

1. CRS antenna port (crs-PortsCount-r11)
2. CRS frequency shift (crs-FreqShift-r11)
3. Subframe configuration (mbsfn-SubframeConfigList-r11) for a multicast/multicast single frequency network (Multimedia Broadcast Multicast Service Single Frequency Network, MBSFN)

1'. CRS antenna port (crs-PortsCount-r11)
2'. CRS frequency shift (crs-FreqShift-r11)
3'. Subframe configuration (mbsfn-SubframeConfigList-r11) for a multicast/multicast single frequency network (Multimedia Broadcast Multicast Service Single Frequency Network, MBSFN)

4. Zero power CSI-RS configuration (csi-RS-ConfigZPId-r11)
5. Start position of a PDSCH (pdsch-Start-r11)
6. Quasi co-located non-zero power CSI-RS configuration (qcl-CSI-RS-ConfigNZPId-r11)

Values of parameters in different parameter sets configured by higher layers are not completely the same.

It should be understood that, in this embodiment of this application, the parameter set configured by higher layers may further include another parameter, but is not limited to the parameters listed above.

Specifically, when mapping data, the network device may bypass CRS RE positions corresponding to the two sets of parameters, that is, send service data at another RE position. In this case, the network device may indicate the two sets of CRS parameters by using the value of the PQI in the DCI. Further, the terminal device determines the foregoing CRS RE positions based on the two sets of CRS parameters, and then the terminal device may bypass these RE positions, that is, perform processing, such as data check, at another RE position, thereby improving a correctness rate of data demodulation, and improving network performance.

TABLE 11

| Value of the PQI field (QCL indication information) | Parameter set configured by higher layers |
|---|---|
| 00 | Parameter set 1 configured by higher layers |
| 01 | Parameter set 2 configured by higher layers |
| 10 | Parameter set 3 configured by higher layers |
| 11 | Parameter set 4 configured by higher layers |

It should be noted that the examples in the foregoing embodiment are used merely to help a person skilled in the art to understand this embodiment of this application, but not to limit this embodiment of this application to the specific values or the specific scenarios in the examples. A person skilled in the art apparently may make various equivalent modifications or changes based on the examples provided above, and such modifications or changes also fall within the scope of this embodiment of this application.

The foregoing describes in detail the method for determining antenna port QCL, according to the embodiments of this application with reference to FIG. 1 to FIG. 3. The following describes in detail devices according to the embodiments of this application with reference to FIG. 4 and FIG. 5.

FIG. 4 is a schematic block diagram of a network device 400 according to an embodiment of this application. Specifically, as shown in FIG. 4, the network device 400 includes a processor 410 and a transceiver 420.

Optionally, the processor 410 is connected to the transceiver 420. Optionally, the network device 400 further includes a memory 430. The memory 430 is connected to the processor 410. The processor 410, the memory 430, and the transceiver 420 communicate with each other by using internal connection paths, to transfer a control and/or data signal. The memory 430 may be configured to store an instruction. The processor 410 is configured to: execute the instruction stored in the memory 430, and control the transceiver 420 to transmit and receive information or signals.

The processor 410 executes the instruction in the memory 430 to generate downlink control information DCI. The DCI includes QCL indication information. The QCL indication information is used by a terminal device to determine, from a plurality of pieces of combination information, combination information corresponding to the QCL indication information. First combination information in the plurality of pieces of combination information is used to indicate at least one QCL relationship between first antenna port information and second antenna port information. The transceiver is configured to send the DCI to the terminal device.

Therefore, in this embodiment of this application, the QCL relationship between a first antenna port and a second antenna port (for example, a DMRS antenna port and a CSI-RS antenna port) can be indicated by using the DCI, so that the terminal device can determine the QCL relationship between the first antenna port and the second antenna port based on the DCI. This resolves a problem in the prior art, and can improve network performance.

Optionally, in another embodiment, the first combination information is used to indicate a QCL relationship between a first set of first antenna port information and a first set of second antenna port information, and a QCL relationship between a second set of first antenna port information and a second set of second antenna port information.

Optionally, in the another embodiment, the first combination information includes a correspondence between a first code word and a first parameter set, and a correspondence between a second code word and a second parameter set.

The first code word corresponds to the first set of first antenna port information, the second code word corresponds to the second set of first antenna port information, the first parameter set corresponds to the first set of second antenna port information, and the second parameter set corresponds to the second set of second antenna port information.

Alternatively, in another embodiment, the first combination information includes a correspondence between an identifier of a first antenna port group and a first parameter set, and a correspondence between an identifier of a second antenna port group and a second parameter set.

The identifier of the first antenna port group corresponds to the first set of first antenna port information, the identifier of the second antenna port group corresponds to the second set of first antenna port information, the first parameter set corresponds to the first set of second antenna port information, and the second parameter corresponds to the second set of second antenna port information.

The first code word corresponds to the first set of first antenna port information, the second code word corresponds to the second set of first antenna port information, the first parameter set corresponds to the first set of second antenna port information, and the second parameter corresponds to the second set of second antenna port information.

Alternatively, in another embodiment, the first combination information includes a correspondence between an identifier of a first code block group CBG and a first parameter set, and a correspondence between an identifier of a second CBG and a second parameter set.

The first CBG corresponds to the first set of first antenna port information, the second CBG corresponds to the second set of first antenna port information, the first parameter set corresponds to the first set of second antenna port information, and the second parameter set corresponds to the second set of second antenna port information.

Alternatively, in another embodiment, the first combination information is configured by using higher layer signaling. The first combination information includes a correspondence between first indication information of the first antenna port and a first parameter, and a correspondence between second indication information of the first antenna port and a second parameter.

The first indication information and the second indication information each include at least one of the following types of information:

a code word identifier, an identifier of a first antenna port group, a CBG identifier, and an identifier of the first antenna port.

The first indication information corresponds to the first set of first antenna port information, the second indication information corresponds to the second set of first antenna port information, the first parameter corresponds to the first set of second antenna port information, and the second parameter corresponds to the second set of second antenna port information.

Optionally, in another embodiment, second combination information in the plurality of pieces of combination information is used to indicate one set of second antenna port information.

Optionally, in another embodiment, the first antenna port is a demodulation reference signal DMRS antenna port, and the second antenna port is a channel state information-reference signal CSI-RS antenna port.

Therefore, in this embodiment of this application, a QCL relationship of a second antenna port (for example, a CSI-RS antenna port) can be indicated by using the DCI, and an existing single-point transmission scenario can be compatible; and QCL relationships between first antenna ports and second antenna ports (for example, DMRS antenna ports and CSI-RS antenna ports) can be indicated by using the DCI in a joint transmission scenario. This can resolve the problem in the prior art, and can improve network performance.

It should be understood that the network device 400 shown in FIG. 4 can implement processes related to the network device in the method embodiment in FIG. 2. Operations and/or functions of various modules in the network device 400 are intended to respectively implement corresponding procedures in the method embodiment in FIG. 2. For details, refer to descriptions in the foregoing method embodiment. To avoid repetition, detailed descriptions are omitted herein as appropriate.

Figure 5:
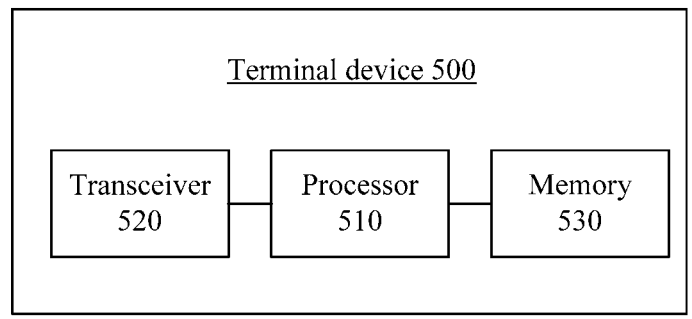
FIG. 5 is a schematic block diagram of a terminal device according to an embodiment of this application.

FIG. 5 is a schematic block diagram of a terminal device 500 according to an embodiment of this application. Specifically, as shown in FIG. 5, the terminal device 500 includes a processor 510 and a transceiver 520.

The processor 510 is connected to the transceiver 520. Optionally, the network device 500 further includes a memory 530. The memory 530 is connected to the processor 510. The processor 510, the memory 530, and the transceiver 520 communicate with each other by using internal connection paths, to transfer a control and/or data signal. The memory 530 may be configured to store an instruction. The processor 510 is configured to execute the instruction stored in the memory 530, and control the transceiver 520 to transmit and receive information or signals.

The processor 510 executes the instruction in the memory 530 to control the transceiver to obtain downlink control information DCI. The DCI includes QCL indication information. The processor is configured to: determine, from a plurality of pieces of combination information based on the QCL indication information, combination information corresponding to the QCL indication information, where first combination information in the plurality of pieces of combination information is used to indicate at least one QCL relationship between first antenna port information and second antenna port information; and determine the QCL relationship between the first antenna port information and the second antenna port information based on the combination information corresponding to the QCL indication information.

Therefore, in this embodiment of this application, the QCL relationship between a first antenna port and a second antenna port (for example, a DMRS antenna port and a CSI-RS antenna port) can be indicated by using the DCI, so that the terminal device can determine the QCL relationship between the first antenna port and the second antenna port based on the DCI. This resolves a problem in the prior art, and can improve network performance.

Optionally, in another embodiment, the first combination information is used to indicate a QCL relationship between a first set of first antenna port information and a first set of second antenna port information, and a QCL relationship between a second set of first antenna port information and a second set of second antenna port information.

Optionally, in the another embodiment, the first combination information includes a correspondence between a first code word and a first parameter set, and a correspondence between a second code word and a second parameter set.

The first code word corresponds to the first set of first antenna port information, the second code word corresponds to the second set of first antenna port information, the first parameter set corresponds to the first set of second antenna port information, and the second parameter set corresponds to the second set of second antenna port information.

Alternatively, in another embodiment, the first combination information includes a correspondence between an identifier of a first antenna port group and a first parameter set, and a correspondence between an identifier of a second antenna port group and a second parameter set.

The identifier of the first antenna port group corresponds to the first set of first antenna port information, the identifier of the second antenna port group corresponds to the second set of first antenna port information, the first parameter set corresponds to the first set of second antenna port information, and the second parameter corresponds to the second set of second antenna port information.

The first code word corresponds to the first set of first antenna port information, the second code word corresponds to the second set of first antenna port information, the first parameter set corresponds to the first set of second antenna port information, and the second parameter corresponds to the second set of second antenna port information.

Alternatively, in another embodiment, the first combination information includes a correspondence between an identifier of a first code block group CBG and a first parameter set, and a correspondence between an identifier of a second CBG and a second parameter set.

The first CBG corresponds to the first set of first antenna port information, the second CBG corresponds to the second set of first antenna port information, the first parameter set corresponds to the first set of second antenna port information, and the second parameter set corresponds to the second set of second antenna port information.

Alternatively, in another embodiment, the first combination information is configured by using higher layer signaling. The first combination information includes a correspondence between first indication information of the first antenna port and a first parameter, and a correspondence between second indication information of the first antenna port and a second parameter.

The first indication information and the second indication information each include at least one of the following types of information:

a code word identifier, an identifier of a first antenna port group, a CBG identifier, and an identifier of the first antenna port.

The first indication information corresponds to the first set of first antenna port information, the second indication information corresponds to the second set of first antenna port information, the first parameter corresponds to the first set of second antenna port information, and the second parameter corresponds to the second set of second antenna port information.

Optionally, in another embodiment, second combination information in the plurality of pieces of combination information is used to indicate one set of second antenna port information.

Optionally, in another embodiment, the first antenna port is a demodulation reference signal DMRS antenna port, and the second antenna port is a channel state information-reference signal CSI-RS antenna port.

Therefore, in this embodiment of this application, a QCL relationship of a second antenna port (for example, a CSI-RS antenna port) can be indicated by using the DCI, and an existing single-point transmission scenario can be compatible; and QCL relationships between first antenna ports and second antenna ports (for example, DMRS antenna ports and CSI-RS antenna ports) can be indicated by using the DCI in a joint transmission scenario. This can resolve the problem in the prior art, and can improve network performance.

It should be understood that the terminal device 500 shown in FIG. 5 can implement processes related to the terminal device in the method embodiment in FIG. 2. Operations and/or functions of various modules in the terminal device 500 are intended to respectively implement corresponding procedures in the method embodiment in FIG. 2. For details, refer to descriptions in the foregoing method embodiment. To avoid repetition, detailed descriptions are omitted herein as appropriate.

It should be understood that the processor 410 or the processor 510 in the embodiments of this application may be implemented by using a processing unit or a chip. Optionally, the transceiver 420 or the transceiver 520 may include a transmitter or a receiver, or include a transceiver unit. The embodiments of this application are not limited thereto.

It should be noted that the processor (for example, the processor 410 in FIG. 4 or the processor 510 in FIG. 5) in the embodiments of this application may be an integrated circuit chip with a signal processing capability. In an implementation process, the steps in the foregoing method embodiment may be completed by using a hardware integrated logic circuit in the processor, or by using an instruction in a form of software. The foregoing processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and the logical block diagrams that are disclosed in the embodiments of this application. The general purpose processor may be a microprocessor, or the processor may be any conventional processor or the like. The steps of the method disclosed with reference to the embodiments of this application may be directly executed and accomplished by a hardware decoding processor, or be executed and accomplished by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It can be understood that the memory (for example, the memory 430 in FIG. 4 or the memory 530 in FIG. 5) in the embodiments of this application may be a volatile memory or a nonvolatile memory, or may include both volatile and nonvolatile memories. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example but not by way of limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink DRAM (SLDRAM), and a direct rambus random access memory (Direct Rambus RAM, DR RAM). It should be noted that the memory in the system and the method described in this specification includes but is not limited to these memories and any memory of another proper type.

An embodiment of this application further provides a computer-readable storage medium, where a computer program is stored in the computer-readable storage medium. When the computer program is executed by a computer, the method for determining antenna port QCL according to any one of the foregoing method embodiments is implemented.

An embodiment of this application further provides a computer program product. When the computer program product is executed by a computer, the method for determining antenna port QCL according to any one of the foregoing method embodiments is implemented.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instruction is loaded and executed on a computer, the procedures or the functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD), a semiconductor medium (for example, a solid state disk (SSD)), or the like.

An embodiment of this application further provides a processing apparatus, including a processor and an interface. The processor is configured to perform the method for determining antenna port QCL according to any one of the foregoing method embodiments.

It should be understood that the processing apparatus may be a chip, and the processor may be implemented by hardware, or may be implemented by software. When implemented by hardware, the processor may be a logic circuit, an integrated circuit, or the like. When implemented by software, the processor may be a general purpose processor, and is implemented by reading software code stored in a memory. The memory may be integrated into the processor, or may exist independently outside the processor.

It should be understood that "one embodiment" or "an embodiment" mentioned in the whole specification means that particular characteristics, structures, or features related to the embodiment are included in at least one embodiment of this application. Therefore, "in one embodiment" or "in an embodiment" appearing throughout the specification does not necessarily refer to a same embodiment. In addition, these particular characteristics, structures, or features may be combined in one or more embodiments in any appropriate manner. It should be understood that sequence numbers of the foregoing processes in the embodiments of this application do not mean execution sequences. The execution sequences of the processes should be determined based on functions and internal logic of the processes, and should not be construed as any limitation on the implementation processes of the embodiments of this application.

In addition, the terms "system" and "network" are usually used interchangeably in this specification. The term "and/or" in this specification describes only an association relationship between associated objects and represents that three relationships may exist. For example, A and/or B may represent three cases: Only A exists, both A and B exist, and only B exists. In addition, the character "/" in this specification generally indicates an "or" relationship between associated objects.

It should be understood that, in the embodiments of this application, "B corresponding to A" indicates that B is associated with A and B can be determined based on A. However, it should be further understood that determining B based on A does not mean that B is determined based only on A, that is, B may be alternatively determined based on A and/or other information.

A person of ordinary skill in the art may be aware that the units and the algorithm steps in the examples described with reference to the embodiments disclosed in this specification can be implemented by electronic hardware, computer software, or a combination thereof. To clearly describe interchangeability between hardware and software, the foregoing has generally described compositions and steps of the examples based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for ease and brevity of description, for specific working processes of the system, apparatus, and unit described above, reference may be made to the corresponding processes in the foregoing method embodiments. Details are not described herein again.

In the several embodiments provided in this application, it should be understood that the disclosed system, apparatus, and method may be implemented in other manners. For example, the apparatus embodiment described above is merely an example. For example, the unit division is merely logical function division, and there may be another division manner in actual implementation. For example, a plurality of units or components may be combined or may be integrated into another system, or some characteristics may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and the parts displayed as units may or may not be physical units, may be located in one position, or may be distributed on a plurality of network units. Some or all of the units may be selected depending an actual requirement, to achieve the objectives of the solutions in the embodiments in this application.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When software is used for implementation, the foregoing functions may be stored in a computer-readable storage medium or transmitted as one or more instructions or code in a computer-readable storage medium. The computer-readable storage medium includes a computer storage medium and a communications medium, where the communications medium includes any medium that enables a computer program to be transmitted from one place to another place. The storage medium may be any usable medium accessible by a computer. The following provides examples but does not impose a limitation: The computer-readable storage medium may include a RAM, a ROM, an EEPROM, a CD-ROM or another optical disc storage, a magnetic disk storage medium or another magnetic storage device, or any other medium that can carry or store expected program code in a form of an instruction or a data structure and that can be accessed by a computer. In addition, any connection may be appropriately defined as a computer-readable storage medium. For example, if software is transmitted from a website, a server, or another remote source by using a coaxial cable, an optical fiber/cable, a twisted pair, a digital subscriber line (DSL), or a wireless technology such as infrared, radio, or microwave, then the coaxial cable, the optical fiber/cable, the twisted pair, the DSL, or the wireless technology such as infrared, radio, or microwave is included in fixation of a medium to which they belong. For example, a disk (Disk) and a disc (disc) used in this application include a compact disc (CD), a laser disc, an optical disc, a digital versatile disc (DVD), a floppy disk, and a Blu-ray disc, where the disk generally copies data magnetically, and the disc copies data optically by using laser. The foregoing combination should also be included in the protection scope of the computer-readable storage medium.

To sum up, the foregoing descriptions are merely examples of embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A method for determining antenna port quasi co-location (QCL), comprising:
obtaining downlink control information (DCI), wherein the DCI comprises QCL indication information;
determining, from a plurality of pieces of combination information, combination information corresponding to the QCL indication information, wherein the combination information indicates at least two QCL relationships between first antenna port information and second antenna port information; and
determining the at least two QCL relationships between the first antenna port information and the second antenna port information based on the combination information corresponding to the QCL indication information.

2. The method according to claim 1, wherein
the combination information indicates a QCL relationship between a first set of first antenna port information and a first set of second antenna port information, and a QCL relationship between a second set of first antenna port information and a second set of second antenna port information.

3. The method according to claim 2, wherein:
the combination information comprises a correspondence between a first code word and a first parameter set, and a correspondence between a second code word and a second parameter set, and
the first code word corresponds to the first set of first antenna port information, the second code word corresponds to the second set of first antenna port information, the first parameter set corresponds to the first set of second antenna port information, and the second parameter set corresponds to the second set of second antenna port information.

4. The method according to claim 1, wherein the QCL indication information is 2 bits, and a correspondence between the QCL indication information and one of the plurality of pieces of combination information satisfies one row of the following table:

| QCL indication information | combination information (correspondence between a code word and a parameter set) |
|---|---|
| 00 | CW1, parameter set 1 configured by higher layers |
|  | CW2, parameter set 2 configured by higher layers |
| 01 | CW1, parameter set 3 configured by higher layers |
|  | CW2, parameter set 4 configured by higher layers |
| 10 | CW1, parameter set 5 configured by higher layers |
|  | CW2, parameter set 6 configured by higher layers |
| 11 | CW1, parameter set 7 configured by higher layers |
|  | CW2, parameter set 8 configured by higher layers. |

5. The method according to claim 3, wherein:
the first parameter set comprises the following parameters:
a cell-specific reference signal (CRS) antenna port, a CRS frequency shift, a subframe configuration for a multicast/multicast single frequency network, a zero power channel state information-reference signal (CSI-RS) configuration, a start position of a data downlink shared channel (PDSCH), and a quasi-co-located non-zero power CSI-RS configuration; and
the second parameter set comprises the following parameters:
a cell-specific reference signal (CRS) antenna port, a CRS frequency shift, a subframe configuration for a multicast/multicast single frequency network, a zero power channel state information-reference signal (CSI-RS) configuration, a start position of a physical downlink shared channel (PDSCH), and a quasi-co-located non-zero power CSI-RS configuration.

6. The method according to claim 2, wherein:
the combination information comprises a correspondence between an identifier of a first antenna port group and a first parameter set, and a correspondence between an identifier of a second antenna port group and a second parameter set, and the identifier of the first antenna port group corresponds to the first set of first antenna port information, the identifier of the second antenna port group corresponds to the second set of first antenna port information, the first parameter set corresponds to the first set of second antenna port information, and the second parameter corresponds to the second set of second antenna port information.

7. The method according to claim 2, wherein:
the plurality of pieces of combination information are configured by higher layer signaling, wherein each of the plurality of pieces of combination information comprises a correspondence between first indication information of a first antenna port and a first parameter, and a correspondence between second indication information of the first antenna port and a second parameter;
the first indication information and the second indication information each comprise at least one of the following types of information: a code word identifier, an identifier of a first antenna port group, a CBG identifier, and an identifier of the first antenna port; and
the first indication information corresponds to the first set of first antenna port information, the second indication information corresponds to the second set of first antenna port information, the first parameter corresponds to the first set of second antenna port information, and the second parameter corresponds to the second set of second antenna port information.

8. An apparatus for determining an antenna port quasi co-location (QCL), comprising:
a processor and a transceiver, wherein:
the processor is configured to generate downlink control information (DCI), wherein the DCI comprises QCL indication information, the QCL indication information is used to indicate combination information corresponding to the QCL indication information, the combination information being from a plurality of pieces of combination information and indicating at least two QCL relationships between first antenna port information and second antenna port information; and
the transceiver is configured to send the DCI to a terminal device.

9. The apparatus according to claim 8, wherein
the combination information indicates a QCL relationship between a first set of first antenna port information and a first set of second antenna port information, and a QCL relationship between a second set of first antenna port information and a second set of second antenna port information.

10. The apparatus according to claim 9, wherein:
the combination information comprises a correspondence between an identifier of a first antenna port group and a first parameter set, and a correspondence between an identifier of a second antenna port group and a second parameter set, and
the identifier of the first antenna port group corresponds to the first set of first antenna port information, the identifier of the second antenna port group corresponds to the second set of first antenna port information, the first parameter set corresponds to the first set of second antenna port information, and the second parameter corresponds to the second set of second antenna port information.

11. The apparatus according to claim 8, wherein:
the combination information comprises a correspondence between a first code word and a first parameter set, and a correspondence between a second code word and a second parameter set, and
the first code word corresponds to the first set of first antenna port information, the second code word corresponds to the second set of first antenna port information, the first parameter set corresponds to the first set of second antenna port information, and the second parameter set corresponds to the second set of second antenna port information.

12. An apparatus for determining an antenna port quasi co-location (QCL), comprising:
a processor and a transceiver, wherein:
the transceiver is configured to obtain downlink control information (DCI), wherein the DCI comprises QCL indication information; and
the processor is configured to:
determine, from a plurality of pieces of combination information, combination information corresponding to the QCL indication information, wherein the combination information indicates at least two QCL relationships between first antenna port information and second antenna port information; and
determine the QCL relationships between the first antenna port information and the second antenna port information based on the combination information corresponding to the QCL indication information.

13. The apparatus according to claim 12, wherein
the combination information indicates a QCL relationship between a first set of first antenna port information and a first set of second antenna port information, and a QCL relationship between a second set of first antenna port information and a second set of second antenna port information.

14. The apparatus according to claim 13, wherein:
the combination information comprises a correspondence between a first code word and a first parameter set, and a correspondence between a second code word and a second parameter set, and
the first code word corresponds to the first set of first antenna port information, the second code word corresponds to the second set of first antenna port information, the first parameter set corresponds to the first set of second antenna port information, and the second parameter set corresponds to the second set of second antenna port information.

15. The apparatus according to claim 12, wherein the QCL indication information is 2 bits, a correspondence between the QCL indication information and one of the plurality of pieces of combination information satisfies one row of the following table:

| QCL indication information | combination information (correspondence between a code word and a parameter set) |
| --- | --- |
| 00 | CW1, parameter set 1 configured by higher layers |
| | CW2, parameter set 2 configured by higher layers |
| 01 | CW1, parameter set 3 configured by higher layers |
| | CW2, parameter set 4 configured by higher layers |
| 10 | CW1, parameter set 5 configured by higher layers |
| | CW2, parameter set 6 configured by higher layers |
| 11 | CW1, parameter set 7 configured by higher layers |
| | CW2, parameter set 8 configured by higher layers. |

16. The apparatus according to claim 14, wherein:
the first parameter set comprises the following parameters:
a cell-specific reference signal (CRS) antenna port, a CRS frequency shift, a subframe configuration for a multicast/multicast single frequency network, a zero power channel state information-reference signal (CSI-RS) configuration, a start position of a physical downlink shared channel (PDSCH), and a quasi-co-located non-zero power CSI-RS configuration; and
the second parameter set comprises the following parameters:
a cell-specific reference signal (CRS) antenna port, a CRS frequency shift, a subframe configuration for a multicast/multicast single frequency network, a zero power channel state information-reference signal (CSI-RS) configuration, a start position of a physical downlink shared channel (PDSCH), and a quasi-co-located non-zero power CSI-RS configuration.

17. The apparatus according to claim 13, wherein:
the combination information comprises a correspondence between an identifier of a first antenna port group and a first parameter set, and a correspondence between an identifier of a second antenna port group and a second parameter set, and
the identifier of the first antenna port group corresponds to the first set of first antenna port information, the identifier of the second antenna port group corresponds to the second set of first antenna port information, the first parameter set corresponds to the first set of second antenna port information, and the second parameter corresponds to the second set of second antenna port information.

18. The apparatus according to claim 13, wherein:
the plurality of pieces of combination information are configured by higher layer signaling, wherein each of the plurality of pieces off combination information comprises a correspondence between first indication information of a first antenna port and a first parameter, and a correspondence between second indication information of the first antenna port and a second parameter;
the first indication information and the second indication information each comprise at least one of the following types of information: a code word identifier, an identifier of a first antenna port group, a CBG identifier, and an identifier of the first antenna port; and
the first indication information corresponds to the first set of first antenna port information, the second indication information corresponds to the second set of first antenna port information, the first parameter corresponds to the first set of second antenna port information, and the second parameter corresponds to the second set of second antenna port information.

19. A system, comprising a terminal device and a network device, wherein:
the terminal device is configured to:
obtain downlink control information (DCI), wherein the DCI comprises QCL indication information;
determine, from a plurality of pieces of combination information, combination information corresponding to the QCL indication information, wherein first the combination information indicates at least two QCL relationships between first antenna port information and second antenna port information; and
determine the QCL relationships between the first antenna port information and the second antenna port information based on the combination information corresponding to the QCL indication information; and
the network device is configured to:
generate the DCI, wherein the DCI comprises the QCL indication information; and
send the DCI to the terminal device.

\* \* \* \* \*

UNITED STATES PATENT AND TRADEMARK OFFICE
CERTIFICATE OF CORRECTION

PATENT NO. : 11,184,090 B2
APPLICATION NO. : 16/674380
DATED : November 23, 2021
INVENTOR(S) : Dou et al.

It is certified that error appears in the above-identified patent and that said Letters Patent is hereby corrected as shown below:

In the Claims

Claim 18: Column 39, Line 37: "the plurality of pieces off combination information" should read -- the plurality of pieces of combination information --.

Claim 19: Column 40, Line 24: "ing to the QCL indication information, wherein first" should read -- ing to the QCL indication information, wherein --.

Signed and Sealed this
Twenty-eighth Day of June, 2022

Katherine Kelly Vidal
*Director of the United States Patent and Trademark Office*